United States Patent
Lochocki, Jr. et al.

(10) Patent No.: US 8,924,109 B2
(45) Date of Patent: Dec. 30, 2014

(54) VIBRATION DETECTION AND MITIGATION IN A VEHICLE

(75) Inventors: Ronald F. Lochocki, Jr., Ypsilanti, MI (US); Kenneth K. Lang, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 265 days.

(21) Appl. No.: 13/490,619

(22) Filed: Jun. 7, 2012

(65) Prior Publication Data

US 2013/0332039 A1    Dec. 12, 2013

(51) Int. Cl.
*G06F 17/00* (2006.01)

(52) U.S. Cl.
USPC .............. 701/60; 701/37; 700/280; 381/71.1; 455/67.1; 367/178; 290/44; 73/760; 250/231.15; 187/222

(58) Field of Classification Search
USPC ........... 701/37; 700/280; 381/71.1; 455/67.1; 367/178; 290/44; 73/760; 250/231.15; 187/222
See application file for complete search history.

(56) References Cited

U.S. PATENT DOCUMENTS

| | | | |
|---|---|---|---|
| 2003/0002686 A1* | 1/2003 | Millott et al. ................ | 381/71.1 |
| 2003/0023357 A1* | 1/2003 | Trudeau et al. ................ | 701/37 |
| 2003/0143957 A1* | 7/2003 | Lyon ............................ | 455/67.1 |
| 2005/0249040 A1* | 11/2005 | Luc et al. ...................... | 367/178 |
| 2006/0066111 A1* | 3/2006 | Suryanarayanan et al. .... | 290/44 |
| 2007/0240517 A1* | 10/2007 | Kingsbury et al. ............ | 73/760 |
| 2009/0149999 A1* | 6/2009 | Schramm et al. ............. | 700/280 |
| 2010/0001177 A1* | 1/2010 | Dolenti et al. ........... | 250/231.15 |
| 2012/0273306 A1* | 11/2012 | Pangrazio et al. ............ | 187/222 |

OTHER PUBLICATIONS

"All-Wheel Driving using Independent Torque Control of Each Wheel", by Hallowell et al. pp. 2590-2595; Proceedings of the American Control Conference, Jun. 2003, published proceedings of said Conference held in Colorado Springs, Jun. 4-6, 2003.*

* cited by examiner

*Primary Examiner* — James Trammell
*Assistant Examiner* — Sanjeev Malhotra
(74) *Attorney, Agent, or Firm* — Quinn Law Group, PLLC

(57) ABSTRACT

A method of controlling a vehicle includes detecting vibration in a drivetrain of the vehicle with a fore/aft accelerometer during a launch event. An operating regime of the vehicle is identified concurrently with the detected vibration when the detected vibration is outside a predefined allowable range. A control strategy of the drivetrain is adjusted to define a revised control strategy to avoid the identified operating regime. The revised control strategy is applied to control the drivetrain to mitigate vibration in the drivetrain.

15 Claims, 2 Drawing Sheets

VIBRATION DETECTION AND MITIGATION IN A VEHICLE

TECHNICAL FIELD

The invention generally relates to a method of controlling the operation of a vehicle to mitigate vibration in a drivetrain of the vehicle.

BACKGROUND

Vibration in a drivetrain of a vehicle is often generated by coupling two moving parts. For example, in a transmission having at least one clutch, such as but not limited to a dual clutch transmission, vibration may occur when one of the clutches is used to couple two different components that are rotating at different speeds, thereby requiring the clutch to slip. The vibration occurs anytime there is instability in the slipping clutch, such as due to an adverse friction coefficient. If the vibration is severe enough, the vibration may be felt by an occupant of the vehicle, which is not desirable. This type of vibration is often referred to as vibrational shudder or vibrational judder.

SUMMARY

A method of controlling a vehicle including a transmission having at least one clutch is provided. The method includes detecting vibration in a drivetrain of the vehicle with a fore/aft accelerometer during a launch event. An operating regime of the vehicle is identified concurrently with the detected vibration when the detected vibration is outside a predefined allowable range. A control strategy of the drivetrain is adjusted to define a revised control strategy to avoid the identified operating regime. The revised control strategy is applied to control the drivetrain to mitigate vibration in the drivetrain.

A vehicle is also provided. The vehicle includes a drivetrain including an engine and a transmission having at least one clutch. A control module is operable to control the operation of the drivetrain. The control module is configured for detecting vibration in a drivetrain of the vehicle with a fore/aft accelerometer during a launch event. The control module identifies an operating regime of the vehicle concurrently with the detected vibration when the detected vibration is outside a predefined allowable range, and adjusts a control strategy of the drivetrain to define a revised control strategy to avoid the identified operating regime. The control module then applies the revised control strategy to control the drivetrain and to mitigate vibration in the drivetrain.

Accordingly, when vibration is detected that is outside of the predefined allowable range, indicating that the vibration may be felt by an occupant of the vehicle, then the operating regime of the vehicle is concurrently identified, and the control strategy used to control the operation of the vehicle when in the identified operating regime is adjusted for future use. The revised control strategy is applied by the control module to control the operation of the vehicle and keep the vehicle out of the identified operating regime, thereby mitigating the vibration in the vehicle and improving customer satisfaction.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
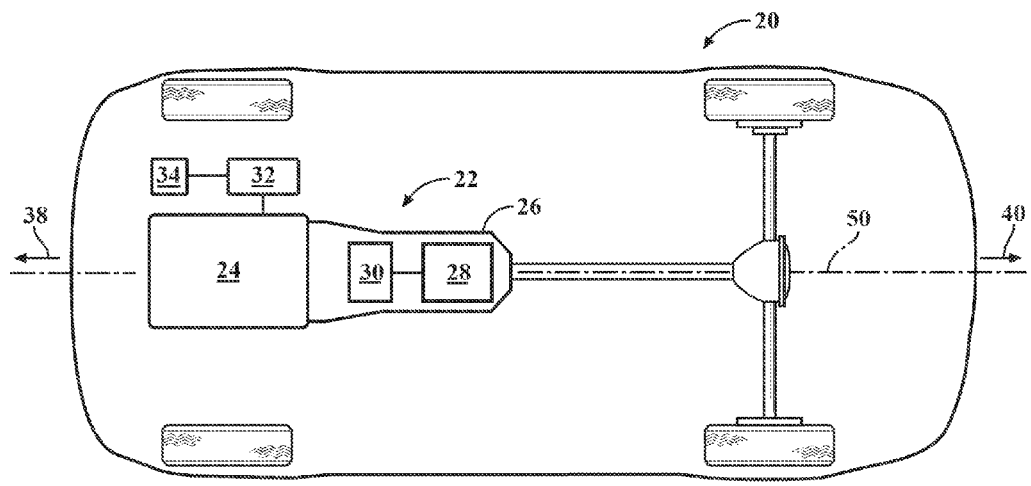
FIG. 1 is a schematic diagram of a vehicle.

Referring to the Figures, wherein like numerals indicate like parts throughout the several views, a vehicle is generally shown at 20 in FIG. 1. The vehicle 20 may include any style of vehicle 20, such as a sedan, truck, SUV, etc. The vehicle 20 includes a drivetrain 22. The drivetrain 22 may include any type/style and/or configuration of drivetrain 22 capable of powering and moving the vehicle 20. The drivetrain 22 may include, for example, but is not limited to, an engine 24 and a transmission 26. The engine 24 may include but is not limited to a gasoline engine 24 or a diesel engine 24. The transmission 26 is coupled to the engine 24, and transmits torque from the engine 24 to a drive axle as is known. The transmission 26 transfers the torque from the engine 24 through a plurality of different gears defining a gearset, generally indicated at 28, to modify the speed to torque ratio. The transmission 26 may include any style and/or configuration of transmission 26, and may include at least one clutch 30 configured for selectively coupling two different rotating components, such as an output from the engine 24 to one of the gears of the gearset 28. The transmission 26 may include, for example, but is not limited to, a dual clutch 30 transmission 26. It should be appreciated by those skilled in the art that the drivetrain 22 may include many other components not specifically described herein, and that the description of the drivetrain 22 and the operation thereof is not necessary to the understanding of the invention, and is therefore limited for clarity.

The vehicle 20 may further include a control module 32, such as but not limited to an engine 24 and/or transmission 26 control unit, to control the operation of the drivetrain 22. The control module 32 may include a computer and/or processor, and include all software, hardware, memory, algorithms, connections, sensors, etc., necessary to manage and control the operation of the drivetrain 22. As such, a method, described below and generally shown in FIG. 3 at 70, may be embodied as a program operable on the control module 32. It should be appreciated that the control module 32 may include any device capable of analyzing data from various sensors, comparing data, making the necessary decisions required to control the operation of the drivetrain 22, and executing the required tasks necessary to control the operation of the drivetrain 22.

A fore/aft accelerometer 34 is incorporated into the vehicle 20. The fore/aft accelerometer 34 detects acceleration along a longitudinal axis of the vehicle 20 in both a forward direction 38, and a rearward direction 40. The fore/aft accelerometer 34 is coupled to and in communication with the control module 32 for sending a signal to the control module 32 indicating the detected acceleration of the vehicle 20. The fore/aft accelerometer 34 may include any type and/or style of accelerometer capable of detecting acceleration of the vehicle 20 in the forward longitudinal direction 38 and rearward longitudinal direction 40 of the vehicle 20.

Figure 3:
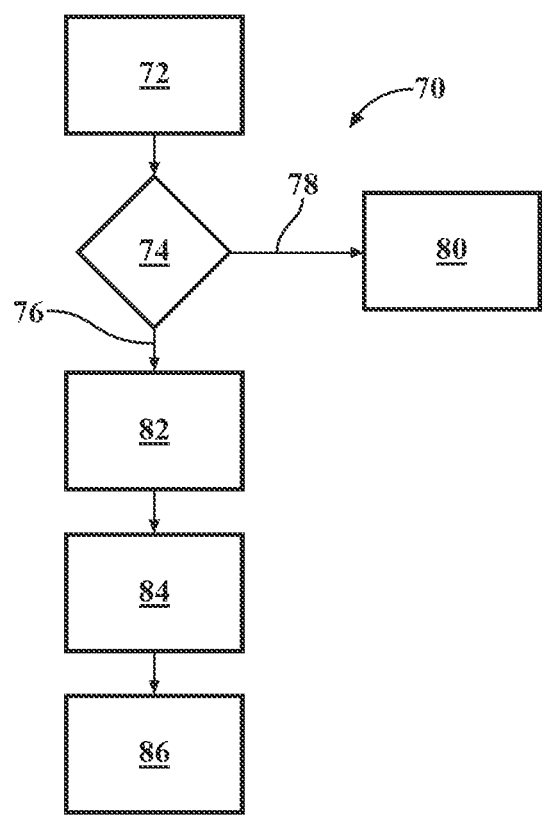
FIG. 3 is a flowchart showing a method of controlling the operation of the vehicle to mitigate vibration in the vehicle.

Referring to FIG. 3, the method of controlling the operation of the vehicle 20 is generally shown at 70. The method includes providing the control module 32 that is operable to control the operation of the drivetrain 22 and/or vehicle 20. As noted above, the control module 32 includes all software, hardware, memory, algorithms, connections, sensors, etc. necessary to manage and control the operation of the drivetrain 22. The control module 32 is operable to perform the various tasks of the method described below.

Figure 2:
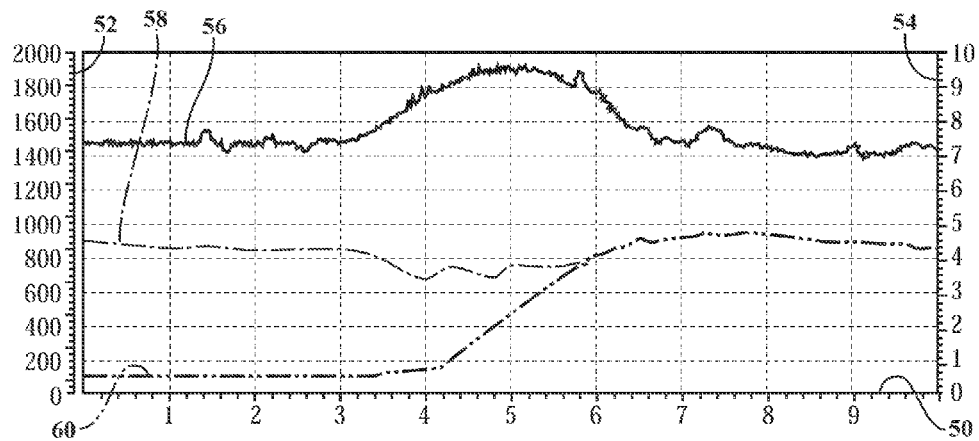
FIG. 2 is a graph relating vibration detected by a fore/aft accelerometer to a speed of an engine and a speed of a clutch.

The method includes detecting vibration, generally indicated by box 72, in the drivetrain 22 of the vehicle 20 with the fore/aft accelerometer 34. As described above, the fore/aft accelerometer 34 detects acceleration of the vehicle 20 in both the forward longitudinal direction 38 and rearward longitudinal direction 40 of the vehicle 20. Referring to FIG. 2, wherein time is indicated along a horizontal axis 50, rotational speed is indicated along a left vertical axis 52, and acceleration is indicated along a right vertical axis 54, detected vibration from the fore/aft accelerometer 34 is generally shown by a signal line 56. As is shown in FIG. 2, the amplitude and frequency of the signal line 56 varies. For exemplary purposes, FIG. 2 shows that the amplitude of the signal line 56 noticeably increases when the clutch 30 is activated to connect the engine 24 to the gearset 28. The rotational speed of the engine 24 is generally shown by an engine 24 speed line 58, and the rotational speed of the clutch 30 is generally shown by a clutch 30 speed line 60. As the clutch 30 is engaged to connect the engine 24 to the gearset, the rotational speed of the clutch 30 increases over time to match the rotational speed of the engine 24. In this period, the clutch 30 is slipping, and vibration is generated, as indicated by the signal line 56. If the amplitude and/or frequency of the vibration is severe enough, an occupant may sense the vibration, which is undesirable.

The detected vibration from the fore/aft accelerometer 34, i.e., the signal line 56, is compared to a predefined allowable range, generally indicated by box 74 to determine if the detected vibration is within the predefined allowable range, or if the detected vibration is outside the predefined allowable range. The predefined allowable range is defined to approximate a level at which an occupant of the vehicle 20 may sense vibration. Accordingly, if the detected vibration is outside the predefined allowable range, generally indicated at 76, then the occupant may sense vibration, and if the detected vibration is within the predefined allowable range, generally indicated at 78, then the occupant is not likely to sense vibration, and no action is taken, generally indicated by box 80.

The predefined allowable range is dependent upon at least one of the amplitude of the fore/aft acceleration of the vehicle 20, or the frequency of the fore/aft acceleration of the vehicle 20. Accordingly, detecting vibration with the fore/aft accelerometer 34 includes measuring the amplitude of the fore/aft acceleration of the vehicle 20, and measuring the frequency of the fore/aft acceleration of the vehicle 20. The control module 32 may measure the amplitude and the frequency of the detected vibration by examining the signal line 56 provided by the fore/aft accelerometer 34. As is commonly understood, the amplitude is defined as the absolute value of the maximum displacement from a zero value during one period of an oscillation, and the frequency is defined as the number of cycles or completed alternations per unit time of a wave or oscillation.

The predefined allowable range may include, for example, but is not limited to, an amplitude range of between 0 and 2 m/s². Accordingly, if the amplitude of the detected vibration is greater than 2 m/s², then the detected vibration is outside the predefined allowable range, and an occupant may sense the vibration. However, if the amplitude of the detected vibration is between 0 and 2 m/s², then the detected vibration is within the predefined allowable range, and the occupant is not likely to sense the vibration. Similarly, the predefined allowable range may include a frequency range of, but is not limited to, a range of less than 16 Hz and greater than 18 Hz. Accordingly, if the frequency of the detected vibration is between 16 and 18 Hz, then the detected vibration is outside the predefined allowable range, and an occupant may sense the vibration. However, if the frequency of the detected vibration is less than 16 Hz, or greater than 18 Hz, then the detected vibration is within the predefined allowable range, and the occupant is not likely to sense the vibration. It should be appreciated that the frequency range may differ than the exemplary frequency range described herein. It should be appreciated that the predefined allowable range may further be based on or partially dependent upon other factors, such as but not limited to a duration of detected vibration greater than a minimum value.

When the control module 32 determines that the detected vibration is outside the predefined allowable range, then the control module 32 identifies an operating regime of the vehicle 20, generally indicated by box 82, concurrently with the detected vibration, i.e., the control module 32 identifies the operating conditions of the vehicle 20 when the vibration is determined to be outside the predefined allowable range.

Identifying the operating regime of the vehicle 20 may include identifying a value for a plurality of different vehicle 20 operating parameters. The plurality of vehicle 20 operating parameters may include, but are not limited to: an engine 24 speed, a transmission 26 input shaft speed, a transmission 26 output shaft speed, a speed gradient, an engine 24 torque, a throttle position, a clutch 30 input torque, or a temperature of one or more components (such as the clutch 30). The identified values for the plurality of different vehicle 20 operating parameters that define the identified operating regime may be stored in memory of the control module 32. It should be appreciated that the control module 32 may identify several different operating regimes that are associated with vibrations exceeding the predefined allowable range.

Once an operating regime associated with excessive vibration is identified, the control module 32 adjusts a control strategy of the vehicle 20 and/or drivetrain 22, generally indicated by box 84, to define a revised control strategy. The control strategy is the strategy used by the control module 32 to control the operation of the vehicle 20 and/or drivetrain 22 in situations similar to the identified operating regime. By adjusting the control strategy, the manner in which the control module 32 controls the operation of the vehicle 20 in situations similar to those associated with the identified operating regime is modified, thereby mitigating the vibration in the drivetrain 22 and/or vehicle 20. Adjusting the control strategy may include for example, but is not limited to, adjusting one or more of the identified values of one or more of the plurality of different vehicle 20 operating parameters. For example, the control module 32 may adjust the control strategy to cause the clutch 30 to lock up with the engine 24 speed more or less quickly, or the speed of the engine 24 may be adjusted, etc.

The control module 32 may then apply the revised control strategy, generally indicated by box 86, during future driving events, to control the drivetrain 22 and mitigate vibration in the drivetrain 22. The revised control strategy is applied to avoid the identified operating regime. As such, if the control module 32 determines that the vehicle 20 is entering into operation similar to the identified operating regime, such as may occur during a launch of the vehicle 20, the control module 32 applies the revised control strategy to avoid the identified operating regime, thereby avoiding the vibration associated with the identified operating regime.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A method of controlling a vehicle including a transmission having at least one clutch, the method comprising:
   detecting vibration in a drivetrain of the vehicle with a fore/aft accelerometer;
   identifying an operating regime of the vehicle concurrently with the detected vibration when the detected vibration is outside a predefined allowable range;
   wherein identifying the operating regime of the vehicle includes identifying a value for a plurality of parameters, including at least one of an engine speed, a transmission input shaft speed, a transmission output shaft speed, a speed gradient, an engine torque, a throttle position, a clutch input torque, or a temperature of a component;
   adjusting a control strategy used to control the drivetrain during the identified operating regime, to define a revised control strategy that avoids the identified operating regime;
   wherein adjusting the control strategy includes adjusting the identified value of one of the plurality of parameters; and
   applying the revised control strategy to control the drivetrain to mitigate vibration in the drivetrain.

2. A method as set forth in claim 1 further comprising comparing the detected vibration to a predefined allowable range to determine if the detected vibration is within the allowable range or outside the allowable range.

3. A method as set forth in claim 1 further comprising storing the identified values for the plurality of parameters in a memory of a control module.

4. A method as set forth in claim 1 wherein detecting vibration with the fore/aft accelerometer includes measuring an amplitude of the fore/aft acceleration of the vehicle.

5. A method as set forth in claim 4 wherein the predefined allowable range includes an amplitude range of between 0 and 2 m/s$^2$.

6. A method as set forth in claim 4 wherein detecting vibration with the fore/aft accelerometer includes measuring a frequency of the fore/aft acceleration of the vehicle.

7. A method as set forth in claim 6 wherein the predefined allowable range includes a frequency range of less than 16 Hz and greater than 18 Hz.

8. A method as set forth in claim 1 wherein the predefined allowable range is dependent upon at least one of an amplitude of the fore/aft acceleration of the vehicle or a frequency of the fore/aft acceleration of the vehicle.

9. A method as set forth in claim 1 further comprising providing a control module operable including all hardware and software necessary to detect vibration outside of the predefined allowable range, identify the operating regime of the vehicle during the detected vibration, adjust the control strategy for the identified operating regime, and applying the revised control strategy during future operating regimes that are similar to the identified operating regime to prevent vibration in the drivetrain.

10. A vehicle comprising:
    a drivetrain including an engine, and a transmission having at least one clutch;
    a control module operable to control the operation of the drivetrain, wherein the control module is configured for:
        detecting vibration in a drivetrain of the vehicle with a fore/aft accelerometer;
        identifying a value for a plurality of parameters, including at least one of an engine speed, a transmission input shaft speed, a transmission output shaft speed, a speed gradient, an engine torque, a throttle position, a clutch input torque, or a temperature of a component;
        identifying an operating regime of the vehicle, from the identified values of the plurality of parameters, concurrently with the detected vibration when the detected vibration is outside a predefined allowable range;
        adjusting a control strategy of the drivetrain, used to control the drivetrain during the identified operating regime, by adjusting the identified value of one of the plurality of parameters, to define a revised control strategy that avoids the identified operating regime; and
        applying the revised control strategy to control the drivetrain to mitigate vibration in the drivetrain.

11. A vehicle as set forth in claim 10 wherein the control module is configured for comparing the detected vibration to the predefined allowable range to determine if the detected vibration is within the predefined allowable range or is outside the predefined allowable range.

12. A vehicle as set forth in claim 10 wherein the predefined allowable range is dependent upon at least one of an amplitude of the fore/aft acceleration of the vehicle or a frequency of the fore/aft acceleration of the vehicle.

13. A vehicle as set forth in claim 12 wherein the control module is configured for measuring at least one of an amplitude of the fore/aft acceleration of the vehicle or a frequency of the fore/aft acceleration of the vehicle.

14. A vehicle as set forth in claim 13 wherein the predefined allowable range includes an amplitude range of between 0 and 2 m/s$^2$, and a frequency range of less than 16 Hz and greater than 18 Hz.

15. A vehicle as set forth in claim 10 wherein the control module includes all hardware and software necessary to detect vibration outside of the predefined allowable range, identify the operating regime of the vehicle during the detected vibration, adjust the control strategy for the identified operating regime, and applying the revised control strategy during future operating regimes that are similar to the identified operating regime to prevent vibration in the drivetrain.

* * * * *